United States Patent
Bandarupalli et al.

(10) Patent No.: US 9,747,298 B2
(45) Date of Patent: Aug. 29, 2017

(54) INLINE GARBAGE COLLECTION FOR LOG-STRUCTURED FILE SYSTEMS

(71) Applicant: VMware, Inc., Palo Alto, CA (US)

(72) Inventors: Sambasiva Rao Bandarupalli, Sunnvale, CA (US); Krishna Yadappanavar, Sunnyvale, CA (US); Anjaneya Prasad Gondi, Fremont, CA (US); Kiran Kumar Thota, Bakersfield, CA (US)

(73) Assignee: VMware, Inc., Palo Alto, CA (US)

( * ) Notice: Subject to any disclaimer, the term of this patent is extended or adjusted under 35 U.S.C. 154(b) by 426 days.

(21) Appl. No.: 14/268,698

(22) Filed: May 2, 2014

(65) Prior Publication Data
US 2015/0317326 A1  Nov. 5, 2015

(51) Int. Cl.
G06F 17/30 (2006.01)
G06F 12/02 (2006.01)

(52) U.S. Cl.
CPC .... *G06F 17/30185* (2013.01); *G06F 12/0269* (2013.01); *G06F 17/3051* (2013.01); *G06F 17/30138* (2013.01); *G06F 17/30144* (2013.01); *G06F 17/30864* (2013.01); *G06F 2212/702* (2013.01)

(58) Field of Classification Search
CPC .................................................. G06F 17/30138
USPC ........................................................ 707/813
See application file for complete search history.

(56) References Cited

U.S. PATENT DOCUMENTS

| | | | | |
|---|---|---|---|---|
| 7,636,744 | B1* | 12/2009 | Aggarwal | G06F 17/30067 |
| 7,797,489 | B1* | 9/2010 | Jiang | G06F 3/0617 |
| | | | | 711/114 |
| 8,443,167 | B1* | 5/2013 | Fallone | G06F 12/0246 |
| | | | | 711/206 |
| 8,527,544 | B1* | 9/2013 | Colgrove | G06F 3/0608 |
| | | | | 707/791 |
| 9,448,919 | B1* | 9/2016 | Boyle | G06F 12/02 |
| 2006/0075007 | A1* | 4/2006 | Anderson | G06F 3/0608 |

(Continued)

OTHER PUBLICATIONS

Log-structured file system, From Wikipedia, the free encyclopedia, downloaded at: http://en.wikipedia.org/wiki/Log-structured_file_system, on Apr. 21, 2014, 3 pages.

(Continued)

*Primary Examiner* — Rehana Perveen
*Assistant Examiner* — Hicham Skhoun (57) ABSTRACT

Exemplary methods, apparatuses, and systems receive a command to overwrite or delete data stored within an allocated portion of a file system. In response to the command, an entry is added to a first data structure. A write command is received. The portion of the file system added to the first data structure is formatted for reallocation. In performance of the write command, the portion of the file system is reallocated. Portions of the file system are allocated from a second data structure when the second data structure includes a sufficient amount of space to satisfy the write command and from the first data structure when the second data structure does not include a sufficient amount of space. The second data structure includes free portions of the file system that have been formatted for allocation. The first data structure includes free portions that have yet to be formatted.

20 Claims, 4 Drawing Sheets

(56) References Cited

U.S. PATENT DOCUMENTS

2012/0233434 A1\* 9/2012 Starks .................. G06F 3/0644
                                                       711/170
2012/0311298 A1\* 12/2012 Post ................. G06F 17/30138
                                                       711/202
2015/0127889 A1\* 5/2015 Hwang ............... G06F 12/0246
                                                       711/103

OTHER PUBLICATIONS

Mendel Rosenblum et al., The Design and Implementation of a Log-Structured File System, Proceedings of the 13th ACM Symposium on Operating Systems Principles, Jul. 24, 1991, 15 pages.

\* cited by examiner

INLINE GARBAGE COLLECTION FOR LOG-STRUCTURED FILE SYSTEMS

FIELD OF THE INVENTION

The various embodiments described herein relate to log-structured file systems. In particular, the embodiments relate to performing inline garbage collection by maintaining and utilizing one or more data structures for free and deleted blocks.

BACKGROUND OF THE INVENTION

A log-structured file system is a file system in which data and metadata are written sequentially, e.g., to a circular buffer or to one of multiple segments of storage. Writes are made in batches in a new location to avoid partial overwrites of physical block. This methodology is proven effective in increasing write speed in flash storage devices. The efficiency of this methodology, however, depreciates as the file system fills up and the same block is rewritten. For example, rewriting a block includes a three-step process. The original block is read from the flash media, modified in memory, and written to the flash media in a new location. The original block is left empty or otherwise flagged until it is processed for re-allocation at a later time. For example, the system may flag the block as having been deleted or overwritten. The process of reallocating deleted and overwritten blocks is referred to as garbage collection. Maintaining a separate process for tracking and reallocating old blocks consumes processing time and power. As the file system fills up, the garbage collection process becomes a choke point for performing new writes or rewrites. For example, if a write is attempted when the file system is full and blocks have yet to be reallocated, the system waits for the garbage collection process to scan for and to reallocate flagged blocks before completing the write.

SUMMARY OF THE INVENTION

Exemplary methods, apparatuses, and systems maintain a free table and delete table as a part of write and delete commands. The free table includes free portions of the file system that have been formatted for allocation and the delete table includes free portions of the file system that have yet to be formatted for allocation. For example, when an embodiment receives a command to overwrite or delete data stored within an allocated portion of a file system, an entry corresponding to the location of the overwritten or deleted data is added to a delete table. The portion of the file system that was added to the delete table is formatted for reallocation. In one embodiment, the portion is formatted in response to a write command. Alternatively, the portion of the file system is formatted in response to a threshold trigger and the formatted portion of the file system is moved to the free table prior to receiving the write command. In performance of the write command, the portion of the file system previously added to the delete table is reallocated. Portions of the file system are allocated from a free table when the free table includes a sufficient amount of space to satisfy the write command and from the delete table when the free table does not include a sufficient amount of space.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein maintain a free table and delete table as a part of write and delete commands. In particular, the free table includes free portions of the file system that have been formatted for allocation and the delete table includes free portions of the file system that have yet to be formatted for allocation. In performing write operations, portions of the file system are allocated from a free table when the free table includes a sufficient amount of space to satisfy the write command and from the delete table when the free table does not include a sufficient amount of space to satisfy the write command. When portions of the file system are deleted or overwritten, they are added to the delete table. As a result of this inline garbage collection, the need for a separate process to perform garbage collection of unused blocks is eliminated.

Figure 1:
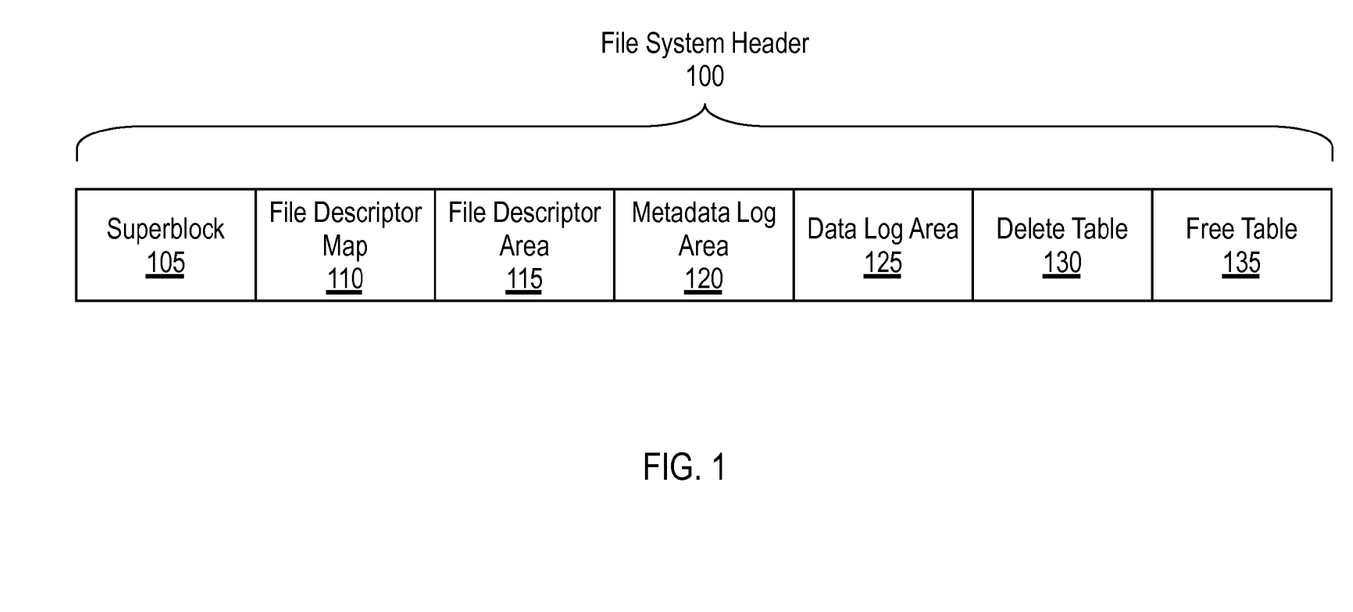
FIG. 1 illustrates, in block diagram form, an exemplary file system header used to implement inline garbage collection.

FIG. 1 illustrates, in block diagram form, exemplary file system header 100 used to implement inline garbage collection. File system header 100 includes superblock 105. Superblock 105 contains the file system type, size, version, identifier, address of other file system header areas, and a maximum number of supported files.

File system header 100 further includes file descriptor map 110. File descriptor map 110 is a bitmap area containing an index of file descriptor entries. The bitmap indicates which file descriptors are free and which are currently being utilized by the file system.

File system header 100 further includes file descriptor area 115. File descriptor area 115 holds the file descriptor for the files within the file system. In one embodiment, each file descriptor size is approximately 4 kilobytes and the file system supports approximately 1024 files, resulting in a file descriptor area of approximately 4 megabytes. Alternatively, the file system supports less files or a much greater number of files. Each file descriptor stores the logical block addressing ("LBA") table entries containing the physical mappings of the corresponding file. In one embodiment, e.g., when the LBA table is formed from fragmented data, the LBA table accounts for multiple entries in the descriptor.

The file system performs various file operations and input/output ("I/O") operations using two logging areas, metadata log area 120 and data log area 125. Metadata log area 120 and data log area 125 also represent the current location to update write command data buffers and metadata about write operations within the file system. The blocks for these logging areas are represented using a metadata log area map and data log area map. As used herein, blocks refer to fixed-size portions of a data or a storage medium. For example, a block may be defined by the file system as a particular number of bytes. The embodiments described herein are not limited to blocks and, as a result, "portions of the file system," "portions of the underlying storage," and the like are used interchangeably with "blocks."

Metadata log area 120 contains information about various operations happening in the file system. In particular, metadata log area 120 holds the log entries representing various file I/O operations. For example, a write operation may include an indication of operation type, file identifier, logical offset, physical offset, length, and Write Sequence Number. The Write Sequence Number ("WSN") is a monotonically increasing number that contains the write order in the file. WSN uniquely identifies the latest region that contains the data for the file. In one embodiment, the size of each operation entry in metadata log area 120 is constant. For example, updates to metadata log area 120 may be performed one page at a time. Data log area 125 stores write data for incoming operations.

File system header 100 further includes delete table 130 and free table 135. While referred to herein as "tables" for the ease of description, delete table 130 and free table 135 may each be implemented as a table, list, array, or another data structure. As used herein, therefore, the term "table" may be used interchangeably with "data structure."

The file system uses delete table 130 and free table 135 to allocate space to metadata log area 120 and data log area 125. For example, when data log area 125 is full, additional space or a new data log area will be allocated from free table 135. Similarly, when metadata log area 120 is full, the file system flushes modified file LBA tables to file descriptor area 115 and allocates another metadata logging area to hold metadata for future operations on the file.

Delete table 130 contains references (e.g., by offset value and length) to portions of the file system storage device that are available for reallocation after being formatted. For example, formatting available space within the file system may include issuing a TRIM command, UNMAP command, or otherwise overwriting the portion of the file system with a particular value, such as all zeroes or all ones. Triggers for formatting portions of the file system referenced by delete table 130 are described herein with reference to FIG. 3. Once formatted, these portions of the file system may be moved to free table 135 or directly allocated to metadata log area 120 and/or data log area 125.

Free table 135 contains references (e.g., by offset value and length) to portions of the file system storage device that have been formatted and are directly available for reallocation to metadata log area 120 and/or data log area 125. In one embodiment, when the file system is initially formatted, free table 135 contains all portions of the file system/underlying storage media that are not otherwise part of file system header 100. Metadata log area map, data log area map, and delete table 130 are initially empty. Alternatively, when the file system is initially formatted, free table 135 is empty and delete table 130 contains all portions of the file system/ underlying storage media that are not otherwise part of file system header 100. As described herein, portions of the file system are moved to free table 135 from delete table 130 after those portions are formatted.

In one embodiment, delete table 130 and free table 135 are stored and maintained within non-volatile memory. Additionally, delete table 130 and free table 135 may be stored within a single data structure with each entry including a bit to indicate whether a particular portion of file system represented in the data structure belongs to delete table 130 or free table 135. In another embodiment, one of delete table 130 and free table 135 is stored and maintained within non-volatile memory while the other is maintained in volatile memory. For example, free table 135 may be constructed upon powering on the device dependent upon the file system (or otherwise during recovery) by reading file system header 100 and subtracting each file LBA table and delete table 130 from the total amount of storage allotted to the file system.

In one embodiment, one or more of the LBA tables, delete table 130, and free table 135 are implemented by compressed bucket list(s). A compressed bucket list is an efficient data structure that stores block numbers using delta bit encoding and bit compression techniques to reduce the size of storage. In particular, a compressed bucket list is a skip list data structure that indexes a sorted list of buckets. Actively used nodes are kept uncompressed while the compressed bucket list compresses other nodes by subtracting the values of adjacent keys and storing the deltas using simple variable length encoding. The use of a compressed bucket list enables the representation of varied sizes of portions of the underlying storage media, e.g., as indicated by length. For example, one region represented in the compressed bucket list may be a contiguous 2 megabytes of storage while another region represented in the compressed bucket list may be a contiguous 3 megabytes of storage. When formatting each region, only a single formatting command (e.g., TRIM or UNMAP) is needed for the corresponding entry in the compressed bucket list. Alternatively, one or more of the LBA tables, delete table 130, and free table 135 are implemented by linked list(s) or another data structure.

Figure 2:
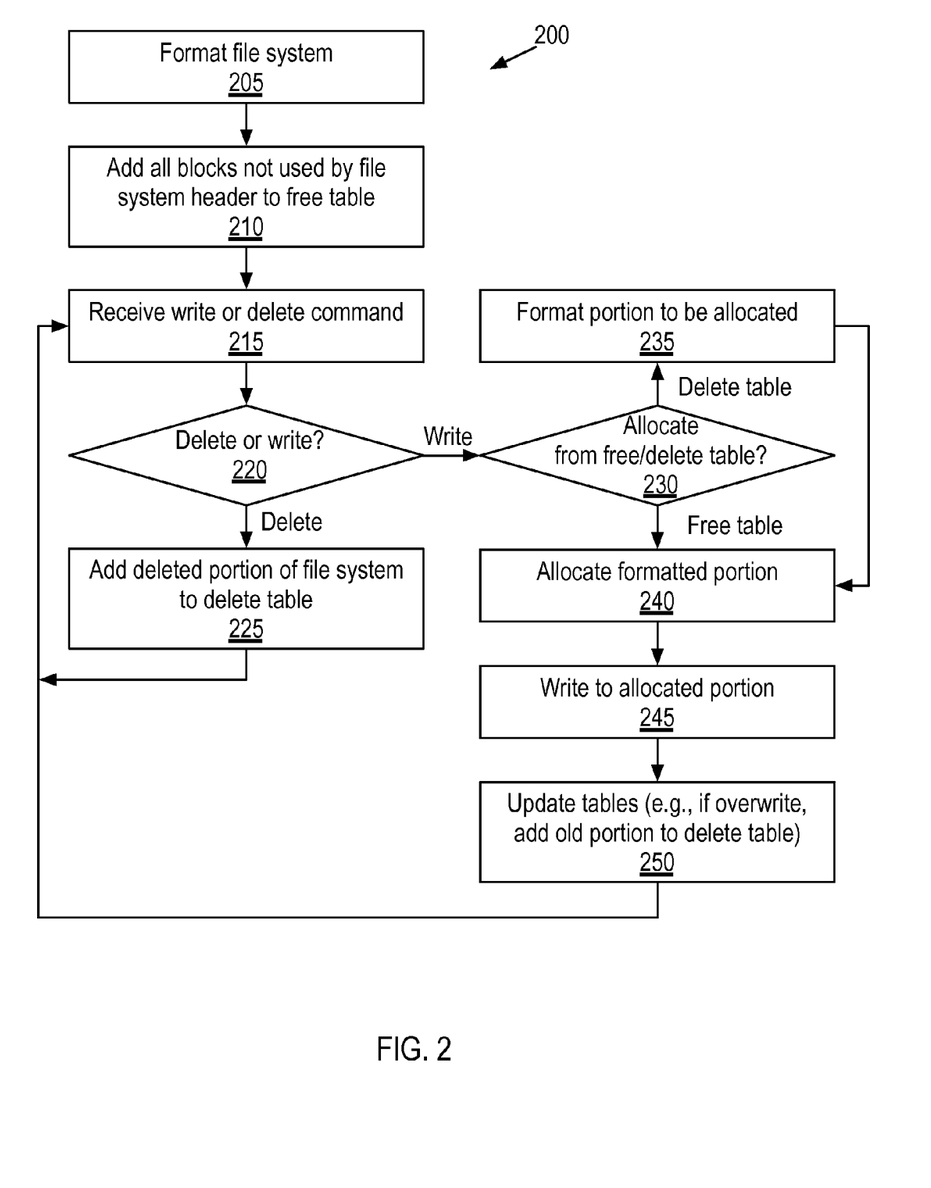
FIG. 2 is a flow chart illustrating an exemplary method of maintaining and utilizing tables of free and deleted blocks to implement inline garbage collection.

FIG. 2 is a flow chart illustrating exemplary method 200 of maintaining and utilizing delete and free tables to implement inline garbage collection. At block 205, the computer performs an initial formatting of the file system. It is unlikely that the computer will perform such an initial formatting of the file system each time method 200 is performed. For example, a single formatting of the file system may serve for multiple executions of method 200. As described above, the initial formatting results in an empty metadata log area map, data log area map, and delete table.

At block 210, the computer adds all portions of the file system that are not otherwise used by the file system header to the free table. For example, as described above, the free table may be constructed within volatile memory.

At block 215, the computer receives a command to delete or write/overwrite data in the file system or to delete data in the file system. At block 220, the computer determines if the command is a delete or a write command. If the received command is a delete command, at block 225, the computer adds the portion of the file system designated by the delete command to the delete table. For example, the computer may prepare and add a file unlink operation log entry to the metadata log area. The file unlink operation entry contains a reference to the LBA table corresponding to the deleted portion of the file system. The computer moves the LBA table into the delete table. The computer updates the corresponding file descriptor for use in future allocations. The computer prepares and adds a file unlink operation completion log entry to the metadata log area. Upon completion of the delete command, method 200 returns to block 215 to perform the next delete or write command.

If the received command is a write command, at block 230, the computer determines if the allocation can be satisfied by the free table or by the delete table. In one embodiment, portions of the file system/storage are allocated from the free table when the free table includes a sufficient amount of space within the file system to satisfy the write command. If the free table does not include a sufficient amount of space, at block 235, the computer formats a portion of the file system referenced by the delete table for allocation. In one embodiment, the computer performs the write command by allocating space from both the free table and the delete table, e.g., when the free table only has enough space to satisfy part of the write command. In such an embodiment, the write command may be split into two writes.

At block 240, the computer allocates a formatted portion of the file system from the free table or the delete table to the metadata log area and/or the data log area. For example, when the current metadata log area is full, the computer adds an allocation entry to the metadata log area, stores each modified LBA table in non-volatile memory (if the LBA table spanned to more entries, the computer updates the file descriptor with reference to new entries of LBA table), allocates a new metadata logging area from the free table, moves the old metadata log area map block(s) to the delete table, and updates the metadata log area map. Similarly, data log area allocation includes adding a log entry to the metadata log area to reflect the allocation, allocating block(s) to the data log area, and updating the data log area map.

At block 245, the computer writes the data to the allocated portion of the file system. At block 250, the computer updates the corresponding tables. For example, the computer prepares and adds a metadata log area entry for the write operation. Such an entry may include the operation type, file identifier, WSN, logical offset, physical offset, and length. The computer writes the data to the allocated portion in the data log area. In the event of an overwrite, the computer moves the previous LBA mappings to the delete table while inserting new mappings into the file's LBA table. The monotonically increasing WSN number identifies the latest write to a region, e.g., the new overwrite will have a higher WSN. The completion of the write to the data log area triggers the preparation and addition of a write completion entry in the metadata log area. The computer inserts an entry in the LBA table that corresponds to the write command and generates an acknowledgment of the write completion.

In one embodiment, all writes to the file system are page-aligned. Alternatively, the file system permits unaligned writes. In such an embodiment, the computer zeroes out (or otherwise formats) the unwritten region of a page or performs a copy-on-write ("COW") for an overwrite. In one embodiment, the computer coalesces write commands. This reduces the number of writes to the underlying storage device. For example, when a coalesced data write completes, the computer can issue a write command to the metadata log area containing multiple log entries that describe all the operations in coalesced data write. Similarly, the computer may coalesce metadata log entry updates, e.g., until the log entries form one page of storage.

Upon completion of the write command, method 200 returns to block 215 to perform the next delete or write command.

Figure 3:
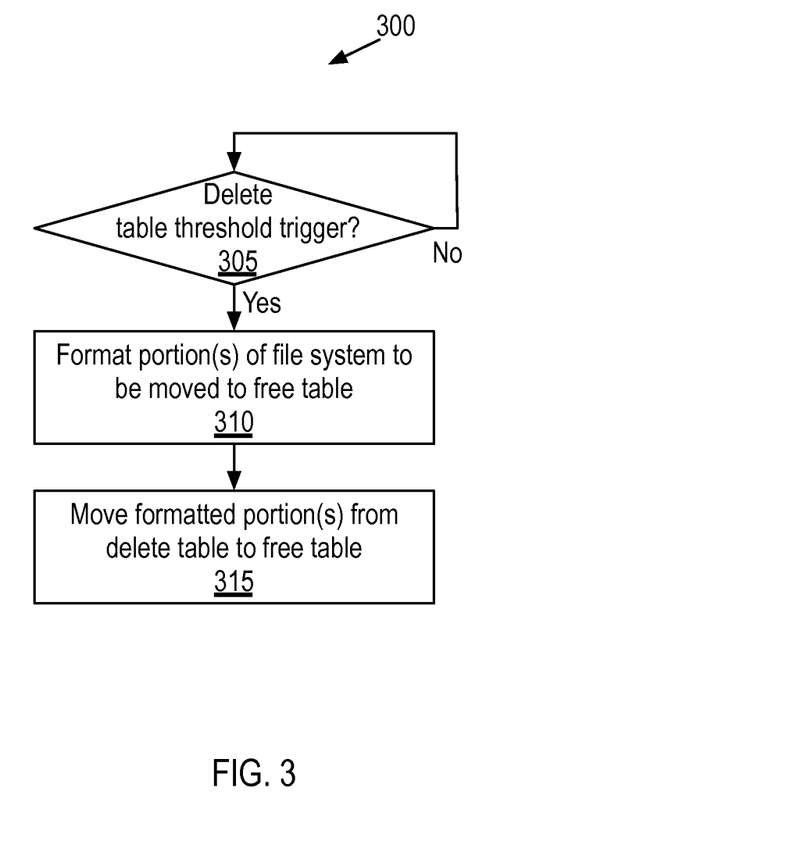
FIG. 3 is a flow chart illustrating an exemplary method of moving blocks from a delete table to a free table in response to a threshold trigger.

FIG. 3 is a flow chart illustrating exemplary method 300 of moving blocks from a delete table to a free table in response to a threshold trigger. In one embodiment, the same process that issues write commands issues the commands for or otherwise performs method 300.

At block 305, the computer determines if a delete table threshold trigger has occurred. Exemplary triggers include a time threshold at which delete table entries are periodically moved to the free table, the computer falling below a threshold level of activity, a determination that the delete table accounts for a threshold amount of total space within the file system, and/or a determination that a portion of the delete table accounts for a threshold amount of contiguous space within the file system.

At block 310, the computer formats portion(s) of the file system to be moved from the delete table to the free table. As described above, this may include issuing a TRIM or UNMAP command for each compressed bucket list entry to be moved from the delete table to the free table.

At block 315, the computer moves the formatted portion(s) from the delete table to the free table. If the system experiences a crash during the performance of method 300, the computer treats any portions that were not successfully moved from the delete table to the free table as unformatted.

Figure 4:
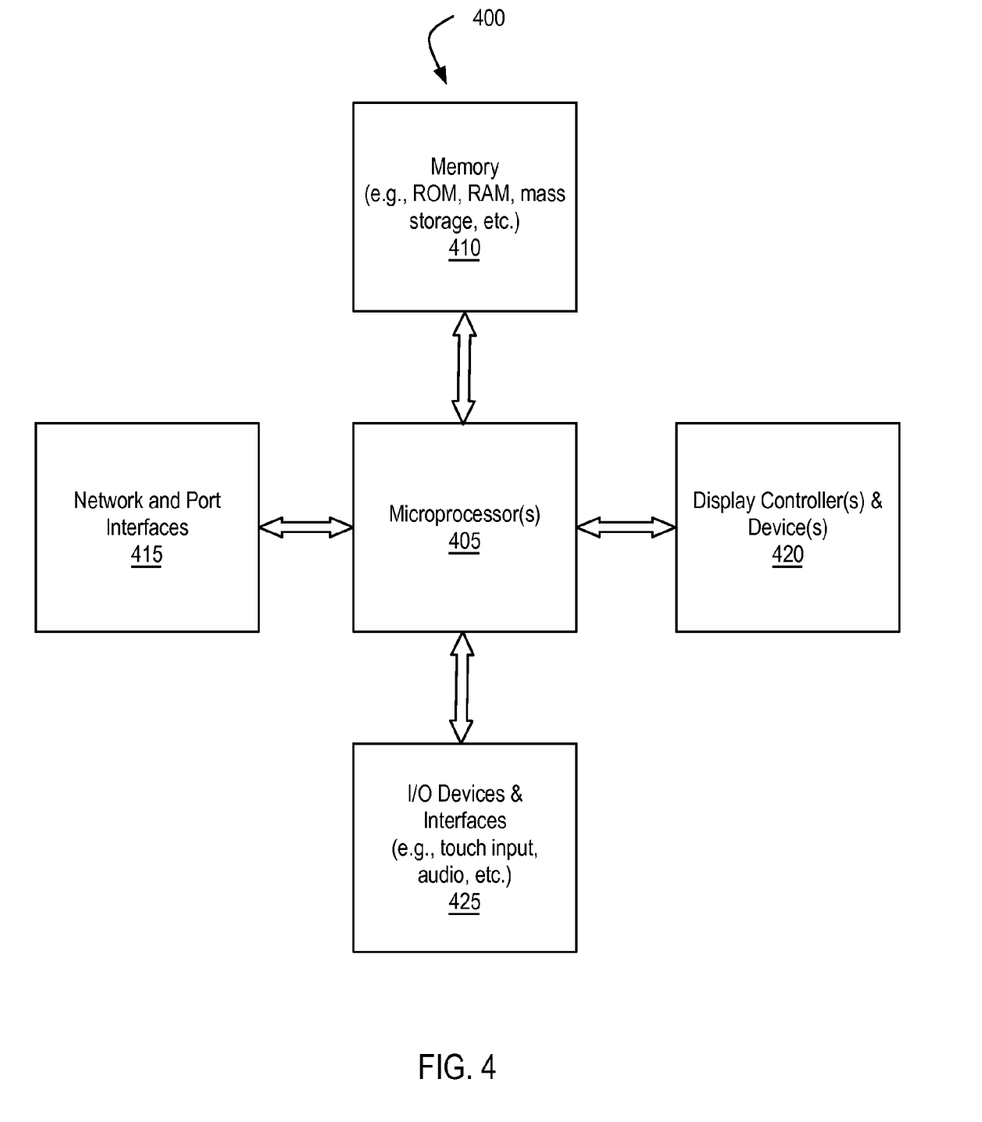
FIG. 4 illustrates, in block diagram form, an exemplary processing system to implement inline garbage collection.

FIG. 4 illustrates, in block diagram form, exemplary processing system 400 to implement inline garbage collection. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented methods 200 and 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, persistent RAM, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    receiving a command to overwrite or delete data stored within an allocated portion of a file system;
    adding, in response to the overwrite or delete command, an entry in a first data structure indicating that the allocated portion of the file system is to be reallocated, wherein the first data structure includes entries identifying free space of the file system that has yet to be formatted for allocation;
    receiving a write command to write data to the file system;
    determining that a second data structure indicates an insufficient amount of formatted free space within the file system to satisfy the write command, wherein the second data structure includes entries identifying free space of the file system that has been formatted for allocation; and
    in response to determining that the second data structure indicates the insufficient amount of formatted free space within the file system to satisfy the write command,
        formatting the portion of the file system that was added to the first data structure, and
        allocating, in performance of the write command, the portion of the file system that was added to the first data structure, wherein portions of the file system are allocated from the second data structure when the second data structure includes a sufficient amount of formatted free space within the file system to satisfy the write command and from the first data structure when the second data structure indicates an insufficient amount of formatted free space within the file system to satisfy the write command.

2. The computer-implemented method of claim 1, wherein the portion of the file system allocated from the first data structure is formatted in response to the write command.

3. The computer-implemented method of claim 1, further comprising:
    receiving a second write command to write data to the file system;
    determining that the second data structure indicates a sufficient amount of formatted free space within the file system to satisfy the second write command; and
    in response to determining that the second data structure indicates the sufficient amount of formatted free space within the file system to satisfy the second write command, allocating a second portion of the file system from the second data structure, wherein the second portion of the file system is formatted in response to a threshold trigger and the formatted second portion of the file system is moved to the second data structure prior to receiving the second write command.

4. The computer-implemented method of claim 3, wherein the threshold trigger is a determination that the first data structure accounts for a threshold amount of space within the file system.

5. The computer-implemented method of claim 3, wherein the threshold trigger is a determination that a portion of the first data structure accounts for a threshold amount of contiguous space within the file system.

6. The computer-implemented method of claim 1, wherein the second data structure is maintained within volatile memory and reconstructed within volatile memory each time a device utilizing the file system is started.

7. The computer-implemented method of claim 1, wherein the second data structure is maintained within non-volatile memory.

8. The computer-implemented method of claim 1, wherein the second data structure and first data structure are implemented as a single data structure with entries in each of the first and second data structures differentiated by the presence or lack of a flag bit.

9. A non-transitory computer-readable medium storing instructions, which when executed by a processing device, cause the processing device to perform a method comprising:
    receiving a command to overwrite or delete data stored within an allocated portion of a file system;
    adding, in response to the overwrite or delete command, an entry in a first data structure indicating that the allocated portion of the file system is to be reallocated, wherein the first data structure includes entries identifying free space of the file system that has yet to be formatted for allocation;
    receiving a write command to write data to the file system;
    determining that a second data structure indicates an insufficient amount of formatted free space within the file system to satisfy the write command, wherein the second data structure includes entries identifying free space of the file system that has been formatted for allocation; and
    in response to determining that the second data structure indicates the insufficient amount of formatted free space within the file system to satisfy the write command,
        formatting the portion of the file system that was added to the first data structure, and
        allocating, in performance of the write command, the portion of the file system that was added to the first data structure, wherein portions of the file system are allocated from the second data structure when the second data structure includes a sufficient amount of formatted free space within the file system to satisfy the write command and from the first data structure when the second data structure indicates an insufficient amount of formatted free space within the file system to satisfy the write command.

10. The non-transitory computer-readable medium of claim 9, wherein the portion of the file system allocated from the first data structure is formatted in response to the write command.

11. The non-transitory computer-readable medium of claim 9, further comprising:
    receiving a second write command to write data to the file system;
    determining that the second data structure indicates a sufficient amount of formatted free space within the file system to satisfy the second write command; and in response to determining that the second data structure indicates the sufficient amount of formatted free space within the file system to satisfy the second write command, allocating a second portion of the file system is allocated from the second data structure, wherein the second portion of the file system is formatted in response to a threshold trigger and the formatted second portion of the file system is moved to the second data structure prior to receiving the second write command.

12. The non-transitory computer-readable medium of claim 11, wherein the threshold trigger is a determination that the first data structure accounts for a threshold amount of space within the file system.

13. The non-transitory computer-readable medium of claim 11, wherein the threshold trigger is a determination that a portion of the first data structure accounts for a threshold amount of contiguous space within the file system.

14. The non-transitory computer-readable medium of claim 9, wherein the second data structure is maintained within volatile memory and reconstructed within volatile memory each time a device utilizing the file system is started.

15. The non-transitory computer-readable medium of claim 9, wherein the second data structure is maintained within non-volatile memory.

16. The non-transitory computer-readable medium of claim 9, wherein the second data structure and first data structure are implemented as a single data structure with entries in each of the first and second data structures differentiated by the presence or lack of a flag bit.

17. An apparatus comprising:
    a processing device; and
    a memory coupled to the processing device, the memory storing instructions which, when executed by the processing device, cause the apparatus to:
        receive a command to overwrite or delete data stored within an allocated portion of a file system;
        add, in response to the overwrite or delete command, an entry in a first data structure indicating that the allocated portion of the file system is to be reallocated, wherein the first data structure includes entries identifying free space of the file system that has yet to be formatted for allocation;
        receive a write command to write data to the file system;
        determine that a second data structure indicates an insufficient amount of formatted free space within the file system to satisfy the write command, wherein the second data structure includes entries identifying free space of the file system that has been formatted for allocation; and
        in response to determining that the second data structure indicates the insufficient amount of formatted free space within the file system to satisfy the write command,
            format the portion of the file system that was added to the first data structure, and
            allocate, in performance of the write command, the portion of the file system that was added to the first data structure, wherein portions of the file system are allocated from the second data structure when the second data structure includes a sufficient amount of formatted free space within the file system to satisfy the write command and from the first data structure when the second data structure indicates an insufficient amount of formatted free space within the file system to satisfy the write command.

18. The apparatus of claim 17, wherein the portion of the file system allocated from the first data structure is formatted in response to the write command.

19. The apparatus of claim 17, further comprising:
receiving a second write command to write data to the file system;
determining that the second data structure indicates a sufficient amount of formatted free space within the file system to satisfy the second write command; and
in response to determining that the second data structure indicates the sufficient amount of formatted free space within the file system to satisfy the second write command, allocating a second portion of the file system is allocated from the second data structure, wherein the second portion of the file system is formatted in response to a threshold trigger and the formatted second portion of the file system is moved to the second data structure prior to receiving the second write command.

20. The apparatus of claim 19, wherein the threshold trigger is a determination that the first data structure accounts for a threshold amount of space within the file system.

* * * * *